(12) United States Patent
Khalil et al.

(10) Patent No.: US 8,792,105 B2
(45) Date of Patent: Jul. 29, 2014

(54) INTERFEROMETER WITH VARIABLE OPTICAL PATH LENGTH REFERENCE MIRROR USING OVERLAPPING DEPTH SCAN SIGNALS

(75) Inventors: Diaa A. Khalil, Cairo (EG); Bassam A. Saadany, Cairo (EG)

(73) Assignee: Si-Ware Systems, Cairo (EG)

( * ) Notice: Subject to any disclaimer, the term of this patent is extended or adjusted under 35 U.S.C. 154(b) by 308 days.

(21) Appl. No.: 13/009,473

(22) Filed: Jan. 19, 2011

(65) Prior Publication Data
US 2011/0176138 A1    Jul. 21, 2011

Related U.S. Application Data (60) Provisional application No. 61/296,403, filed on Jan. 19, 2010.

(51) Int. Cl.
G01B 11/02 (2006.01)
(52) U.S. Cl.
USPC .......................................... 356/497
(58) Field of Classification Search
USPC ................................. 356/450–521
See application file for complete search history.

(56) References Cited

U.S. PATENT DOCUMENTS

| | | | | |
|---|---|---|---|---|
| 5,321,501 A * | 6/1994 | Swanson et al. | | 356/479 |
| 5,777,746 A | 7/1998 | Dlugos | | |
| 2004/0114151 A1* | 6/2004 | Tanno et al. | | 356/497 |
| 2004/0239946 A1* | 12/2004 | Kane et al. | | 356/497 |
| 2005/0128488 A1* | 6/2005 | Yelin et al. | | 356/496 |
| 2007/0211255 A1* | 9/2007 | Ohkubo | | 356/479 |
| 2007/0291276 A1* | 12/2007 | Fercher | | 356/497 |
| 2008/0080034 A1 | 4/2008 | Saadany | | |
| 2009/0185191 A1 | 7/2009 | Boppart | | |
| 2009/0263040 A1* | 10/2009 | Rolland et al. | | 382/255 |
| 2009/0279098 A1 | 11/2009 | Ohbayashi | | |
| 2010/0181462 A1* | 7/2010 | Sugita | | 250/201.8 |
| 2011/0164791 A1* | 7/2011 | Bajraszewski et al. | | 382/107 |
| 2011/0176142 A1* | 7/2011 | Hacker et al. | | 356/479 |

FOREIGN PATENT DOCUMENTS

| | | | | |
|---|---|---|---|---|
| CH | WO2008129862 | * | 10/2008 | G01N 21/17 |
| DE | 19926019 A1 | | 12/2000 | |
| EP | 1055982 A1 | | 11/2000 | |

OTHER PUBLICATIONS

International Search Report and Written Opinion: PCT/US2011/021681 dated Jul. 1, 2011 (10 pages).

* cited by examiner

*Primary Examiner* — Tarifur Chowdhury
*Assistant Examiner* — Michael P Lapage
(74) *Attorney, Agent, or Firm* — Garlick & Markison; Holly L. Rudnick (57) ABSTRACT

An interferometer includes a variable optical path length reference mirror to produce a final interferogram from a combination of interferograms. Each of the interferograms is generated at a different optical path length of the reference mirror.

11 Claims, 8 Drawing Sheets

INTERFEROMETER WITH VARIABLE OPTICAL PATH LENGTH REFERENCE MIRROR USING OVERLAPPING DEPTH SCAN SIGNALS

CROSS REFERENCE TO RELATED PATENTS

The present U.S. Utility Patent Application claims priority pursuant to 35 U.S.C. §119(e) to U.S. Provisional Application Ser. No. 61/296,403, entitled, "SHIFTED SPECTRAL DOMAIN OCT TECHNIQUE AND ITS FABRICATION IN OPTICAL MEMS TECHNOLOGY," filed Jan. 19, 2010, which is incorporated by reference herein and made part of the present U.S. Utility Patent Application for all purposes.

BACKGROUND OF THE INVENTION

1. Technical Field of the Invention

The present invention relates in general to interferometers, and in particular, to interferometer architectures, fabrications and applications.

2. Description of Related Art

Interferometers split a beam of light into two paths (or arms), bouncing them back and recombining them to detect an interference pattern produced as a result of the recombination. The different arms may be of different lengths or composed of different material to create alternating interference fringes on a back detector.

One of the most significant interferometer-based imaging techniques developed in the past several decades is Optical Coherence Tomography (OCT). The appearance of OCT in the 1990's filled the gap in biomedical imaging between high resolution small penetration depth optical confocal microscopy and low resolution high penetration depth HF ultrasound. OCT was originally developed in communication systems for the characterization of integrated optical or fiber optical components. After OCT was proposed by MIT for tomography of the human eye, the number of companies developing medical instruments using OCT has increased exponentially.

There are several different OCT techniques, but all of the techniques use a Michelson interferometer in which the sample under test is inserted into one of the two arms of the interferometer. The second arm, called the reference arm, typically includes a conventional mirror (e.g., a metallic mirror). The output of the interferometer delivers the required information signal.

One common OCT technique is the Time Domain OCT or simply TD OCT. In the TD OCT, the signal reflected from the reference arm has the same time delay as the signal coming from the sample, so that there are two mutually coherent signals. In addition, the input source is a low coherence length source (a source with a wide spectrum), and thus the output is maximal only within the coherence length of the source. The amplitude of this maximum represents the amplitude of reflection from a point in the sample corresponding to the position of the reference arm mirror. If this position is scanned, the output power with each reference arm mirror position is measured and then the resulting output powers are used to construct an interferogram. By this way, a depth tracking signal is obtained in the TD OCT technique. However, the coherence length of the input source may only be few microns. As such, the resolution limit of the TD OCT technique may be limited.

In a different technique, called the spectral domain technique (SD OCT), the reference arm has a fixed mirror and the reflected signal from the interferometer is passed through an optical spectrometer and then inverse Fourier Transformed (IFFT). The signal obtained after the IFFT represents the depth tracking signal in the spectral domain technique. The corresponding maximum depth is determined by the resolution of the spectrometer used as:

$$z_{max} = \frac{\lambda^2}{4n\delta\lambda}$$

where $\lambda$ is the wavelength, $\delta\lambda$ is the spectrometer resolution and n is the average sample refractive index.

In a similar technique, called the frequency domain OCT (FD OCT), the low coherence source is replaced by a tunable laser source, the output of the interferometer is compared against the different optical frequencies and an IFFT is used to gain the depth tracking signal. In the FD OCT, the resolution is represented by the maximum tuning range of the laser used.

Traditional OCT devices are constructed using conventional metallic mirrors. However, with the introduction of Micro Electro-Mechanical Systems (MEMS) technology, there has been an increasing interest in developing a MEMS OCT device. MEMS refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components.

The fabrication of an OCT device using MEMS technology could be a great advantage as it enables a low cost, low weight and size OCT head to be produced, which is desired in biomedical applications. The OCT head is usually portable, and thus lends itself to MEMS technology. However, there are several technical challenges to introducing an OCT head enabled by MEMS technology.

One of the main challenges is the scanning depth. In TD OCT, the scanning depth is determined by the travel range of the mirror. However, the state of the art travel range of MEMS mirrors is limited (<0.5 mm), which greatly limits the applicability of MEMS technology in TD OCT. In addition, although the reference mirror is fixed in SD OCT, the scanning depth is limited by the resolution of the spectrometer. This presents a difficult challenge since MEMS spectrometers typically have limited resolutions as a result of the small mirror travel range in Fourier Transform Spectrometers or the number of pixels in dispersive spectrometers.

SUMMARY OF THE INVENTION

Embodiments of the present invention provide an interferometer having a variable optical path length reference mirror. In one embodiment, the interferometer includes a beam splitter, a reflecting object on a first interferometer arm and a reference mirror on a second interferometer arm. The beam splitter is optically coupled to receive an incident beam and operable to split the incident beam into a first beam and a second beam. The reflecting object is optically coupled to receive the first beam and operable to reflect the first beam to produce a first reflected beam directed towards the beam splitter. The reference mirror is optically coupled to receive, at an initial time, the second beam while the reference mirror is in an initial position having an initial optical path length and to reflect the second beam to produce an initial second reflected beam directed towards the beam splitter to cause interference between the first reflected beam and the initial second reflected beam at the beam splitter and produce an initial interferogram therefrom. The reference mirror is further optically coupled to receive, at an additional time subsequent to the first time, the second beam while the reference mirror is in an additional position at an additional optical path length and to reflect the second beam to produce an additional second reflected beam directed towards the beam splitter to cause interference between the first reflected beam and the additional second reflected beam at the beam splitter and produce an additional interferogram therefrom. A final interferogram is produced from a combination of the initial interferogram and the additional inteferogram. The optical path length difference between the first interferometer arm and the second interferometer arm of the final interferogram corresponds to the sum of the respective optical path length differences of the initial interferogram and the additional interferogram.

In an exemplary embodiment, the reference mirror includes a single moveable mirror moveable between at least the initial position and the additional position. In another exemplary embodiment, the reference mirror includes a first mirror at the initial position and a second mirror at additional position. For example, the first mirror and the second mirror can be selected by physically removing one of the first mirror and the second mirror and physically inserting the other mirror. As another example, the second mirror can be selected by moving the first mirror out of an optical path of the second beam. In another example, a rotary mirror can be used to direct the second beam towards the first mirror or the second mirror.

In a further embodiment, the interferometer is a Micro Electro-Mechanical System (MEMS) interferometer including first and second mediums in which the beam splitter is formed at an interface between the first and second mediums and the first beam propagates in the first medium towards the reflecting object, while the second beam propagates in the second medium towards the reference mirror. In addition, the MEMS interferometer can include a MEMS actuator coupled to the reference mirror to cause a linear displacement of the reference mirror.

In still a further embodiment, the interferometer is a Fourier Transform spectrometer, and the reflecting object is a moveable mirror. In this embodiment, the combination of the initial interferogram and the additional interferogram improves the resolution of the Fourier Transform spectrometer.

In another embodiment, the interferometer is a Michelson interferometer for use within an Optical Coherence Tomography (OCT) apparatus. For example, in an exemplary embodiment, the OCT apparatus applies a shifted spectral domain OCT technique or a frequency domain technique. In this embodiment, the reflecting object is a sample under test, the initial interferogram is used to produce a first depth scan signal, the additional interferogram is used to produce a second depth scan signal and a final reconstructed depth scan is produced from a combination of the first depth scan signal and the second depth scan signal.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

An interferometer in accordance with embodiments of the present invention provides a variable distance reference mirror to enable multiple interference signals at different reference mirror positions to be obtained. The combination of the interference signals can result in an improved resolution for a Fourier Transform spectrometer or an increased scanning depth for an Optical Coherence Tomography (OCT) device.

Figure 1:
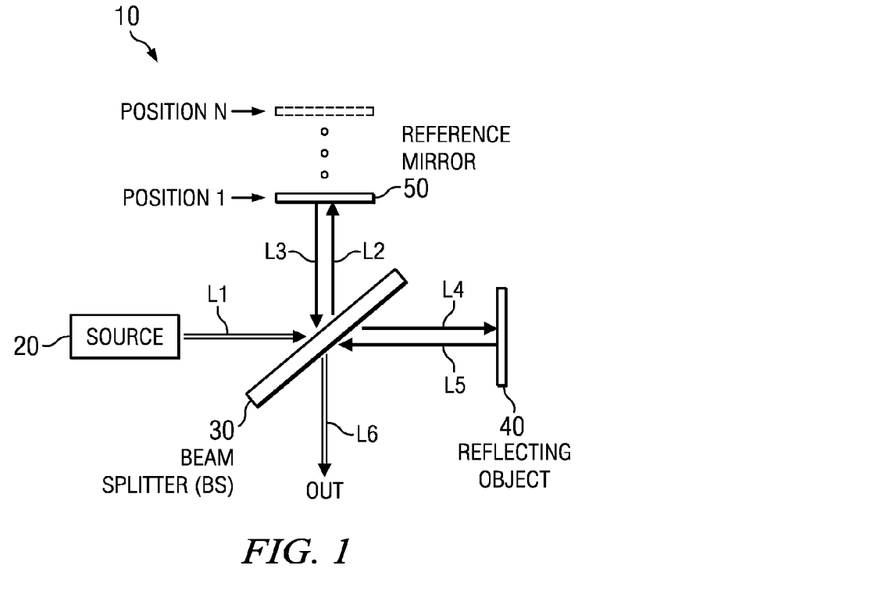
FIG. 1 is a diagram illustrating an exemplary interferometer in accordance with embodiments of the present invention.

Turning now to FIG. 1, there is illustrated an exemplary interferometer in accordance with embodiments of the present invention. The interferometer 10 can be constructed using traditional mirrors or fabricated using, for example, conventional MEMS technology with one lithography step and classical metallization, as described in more detail below in connection with FIGS. 9A-9J.

The interferometer 10 includes a light source 20, a beam splitter 30, a reflecting object 40 on a first interferometer arm and a reference mirror 50 on a second interferometer arm. The light source 20 may be, for example, a laser source, a collimated LED, an optical fiber, or any other type of optical source. The light source 20 may produce visible, Infra Red (IR), Ultra Violet (UV), X-ray or Microwave radiation. The reflecting object 40 may be a mirror or other object capable of reflecting at least a portion of a light beam.

In accordance with embodiments of the present invention, the reference mirror 50 may include one or more mirrors capable of being positioned at different optical path lengths (Position 1 . . . Position N) from the beam splitter 30. In an exemplary operation, the reference mirror 50 is positioned at an initial position (e.g., Position 1), and an incident beam L1 from the light source impinges upon beam splitter 30, which is positioned at an angle (for example, 45 degrees) from the incident beam L1. The incident beam L1 is thus split in two beams L2 and L4, where L2 propagates towards the reference mirror 50 and L4 propagates towards the reflecting object 40. L2 originates from the partial reflection of the incident beam L1 from the beam splitter 30, and thus has a reflection angle equal to the beam incidence angle. L4 originates from the partial transmission of the incident beam L1 through beam splitter 30 and propagates at an angle θ2 (determined by Snell's law).

L2 is reflected by reference mirror 50 to produce reflected beam L3, while L4 is at least partially reflected by reflecting object 40, thus producing reflected beam L5. As shown in FIG. 1, both beams L3 and L5 take the same optical path (in the opposite direction) after reflection from the reference mirror 50 and reflecting object 40, respectively, back towards beam splitter 30. Beam splitter 30 then partially transmits reflected beam L3 and partially reflects reflected beam L5 to produce an interferogram L6 that can be detected at an output of the interferometer 10. For example, the interferometer can include one or more photodetectors at the output thereof.

The reference mirror 50 can then be moved to a new position (e.g., Position N) and the process is repeated to obtain a new interferogram. A combination of measured interferograms can be used to determine a final interferogram of the interferometer 10. The final interferogram has an optical path length difference between the first and second interferometer arms corresponding to the sum of the respective optical path length differences of the measured interferograms. Such a combination can improve the scanning depth in, for example, a Spectral Doman Optical Coherence Tomography (SD OCT) device.

Figure 2:
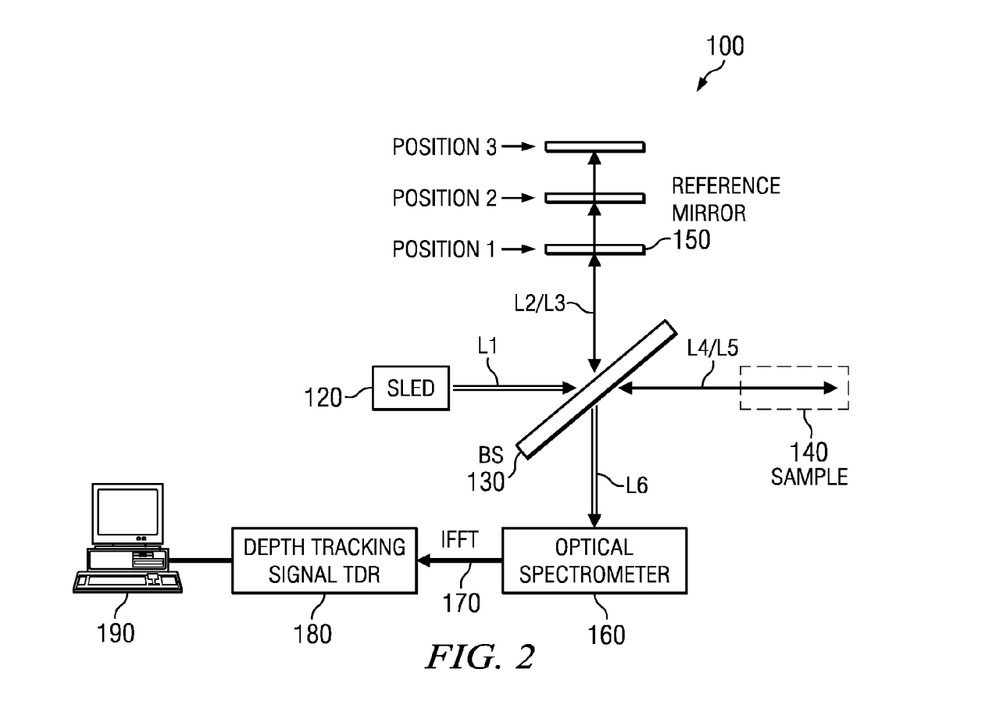
FIG. 2 illustrates an exemplary Optical Coherence Tomography (OCT) apparatus incorporating the interferometer of FIG. 1 in accordance with embodiments of the present invention.

An example of an SD OCT device 100 incorporating the interferometer of FIG. 1 is shown in FIG. 2. The SD OCT device 100 of FIG. 2 implements a shifted spectral domain technique. In particular, the SD OCT device 100 includes a light source 120, beam splitter 130, sample under test (sample 140), reference mirror 150, optical spectrometer 160, image processor 180 and display device 190. The light source 120 is shown as a superluminescent light emitting diode (SLED), but it should be understood that other types of light sources could be used. The sample 140 may be, for example, a biological tissue sample or other sample to be tested. In FIG. 2, the reference mirror 150 is shown have three different positions (Position 1, Position 2 and Position 3). However, it should be understood that any combination of two or more different positions can be used in embodiments of the present invention.

In an exemplary operation, the reference mirror 150 is positioned at an initial position (e.g., Position 1), and an incident beam L1 from the light source 120 impinges upon beam splitter 30, which is positioned at an angle (for example, 45 degrees) from the incident beam L1. The incident beam L1 is thus split in two beams L2 and L4, where L2 propagates towards the reference mirror 150 at Position 1 and L4 propagates towards the sample 140. L2 is reflected by reference mirror 150 to produce reflected beam L3 directed towards beam splitter 130, while a small portion of L4 is reflected from sub-surface features of the sample 140, thus producing reflected beam L5 directed towards beam splitter 130. Beam splitter 30 then partially transmits reflected beam L3 and partially reflects reflected beam L5 to produce an interferogram L6 that is input to optical spectrometer 160.

The output of the interferometer 100 is measured by the optical spectrometer 160, and then inverse Fourier transformed to produce an IFFT signal 170. The IFFT signal 170 is input to an image processor 180 to obtain a depth scan signal with respect to a certain reference position of the reference mirror 160. The reference mirror 150 is then displaced to a second position (e.g., Position 2) and the spectrum is again measured, IFFT and processed at the new position. This process is repeated with displacing the reference mirror 150 until the required depth of the sample is scanned. The maximum depth scan is thus given by:

$$z_{max} = M \frac{\lambda^2}{4n\delta\lambda}$$

where M is the number of reference mirror positions used, which is also the number of repeated spectrum measurements. The resulting combination of depth scan signals is processed by the image processor 180 using, for example, TDR (time domain resolution), to generate a 3-D image, which is output to a display device 190 for rendering (viewing) image thereon.

The shifted spectral domain OCT technique shown in FIG. 2 allows scanning more depths in the sample 140 with the same spectrometer resolution, thus overcoming the depth limitations resulting from the finite spectrometer resolution. In addition, the variable optical path length reference mirror can also be implemented with a frequency domain OCT (FD OCT) device (not shown) to increase the scanning depth by multiple order without the need for step control of the tunable laser source.

The image processor 180 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The image processor 180 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

Figure 3:
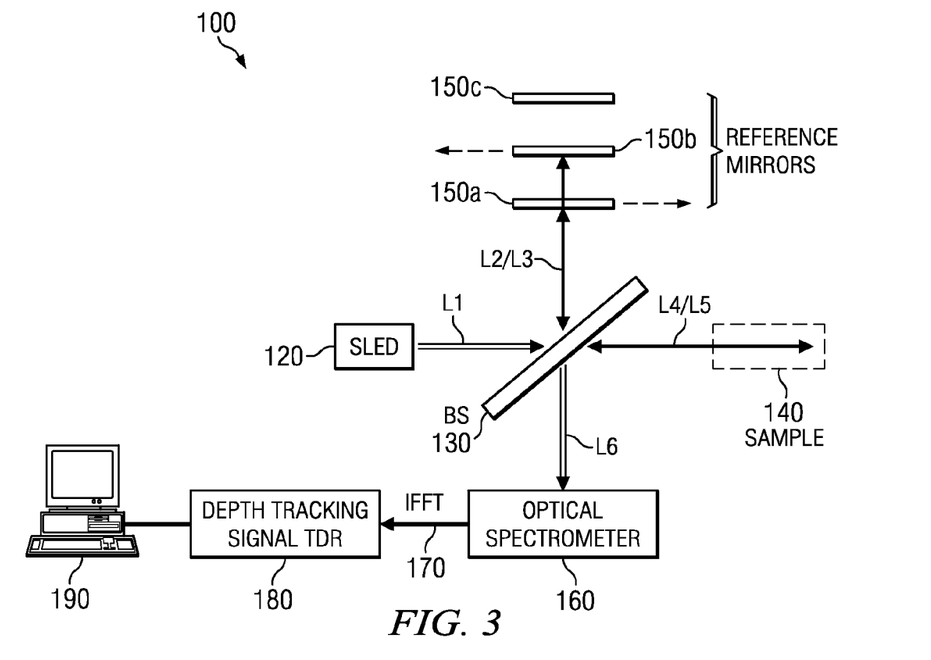
FIG. 3 illustrates another exemplary interferometer implemented within an OCT apparatus in accordance with embodiments of the present invention.

The reference mirror position can be changed by displacing the reference mirror axially or by physically removing the reference mirror at one position and inserting a new reference mirror having a different position with respect to the beam splitter 30. In another embodiment, as shown in FIG. 3, the reference mirror 150 can include multiple fixed mirrors 150a-150c within the interferometer 100, each at a fixed predetermined position. In this embodiment, to change the effective reference mirror position, one or more reference mirrors 150a-150c are moved laterally out of an optical path of beams L2/L3. For example, to use reference mirror 150c, reference mirror 150a is moved laterally in one direction, while reference mirror 150b is moved laterally in the other direction or in the same direction (the former being illustrated) to allow beam L2 to reach mirror 150c.

In the embodiments shown in FIG. 2 and FIG. 3, the mirror displacement is digital for a specific position. In one embodiment, the mirror positions may be separated by exactly the maximum scanning depth determined by the spectrometer resolution. In another embodiment, the separation may be smaller than the maximum scanning depth to allow for an overlap that may be used to improve the signal-to-noise (S/N) ratio in the final reconstructed depth scan. In addition, although each technique (axially moveable mirror or multiple laterally moveable mirrors) may be applicable to a MEMS-based OCT device, the technique shown in FIG. 3 may be more compatible with a MEMS-based OCT device, since the different mirror displacements are relatively small and determined by the spot size diameter and not related to the maximum scan depth.

Figure 4:
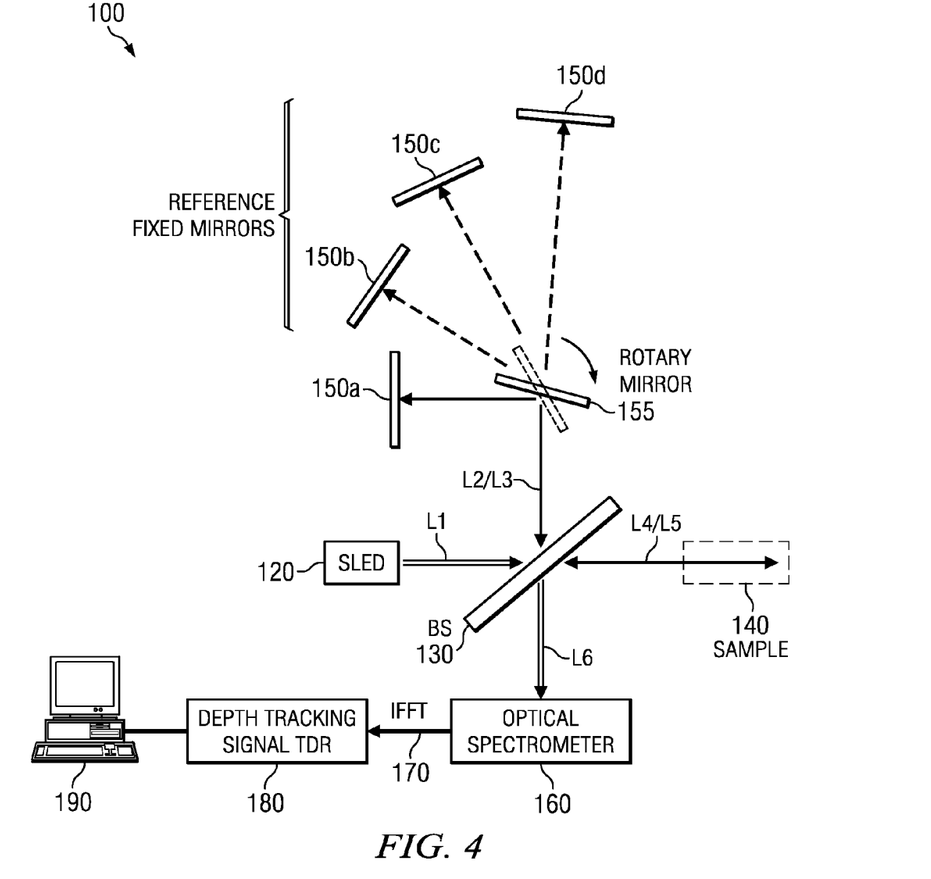
FIG. 4 illustrates yet another exemplary interferometer implemented within an OCT apparatus in accordance with embodiments of the present invention.

FIG. 4 illustrates another technique for obtaining the shift in the reference mirror positions. In FIG. 4, a rotating mirror 155 is used to reflect the reference arm beam L2 to several fixed mirrors 150a-150d at different predetermined positions and inclinations. In this technique, the rotary mirror 155 is digitally rotated to different angles, such that for each angle, the beam is directed to a specific fixed mirror 150a-150d normal to its direction. As such, the reference mirror position and corresponding optical path length from the beam splitter 30 can be digitally controlled. As in the embodiments shown in FIGS. 2 and 3, the rotating mirror embodiment of FIG. 4 can also be realized using MEMS technology.

Figure 5:
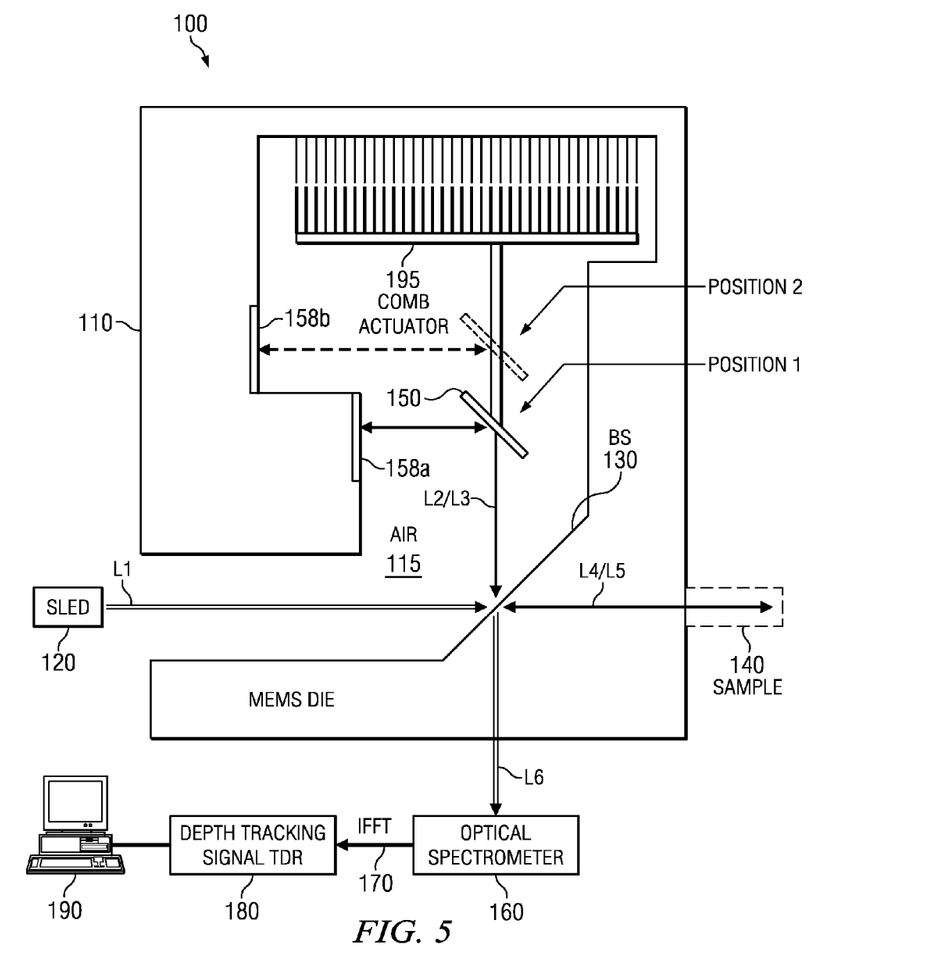
FIG. 5 illustrates an exemplary Micro Electro-Mechanical Systems (MEMS) interferometer implemented within an OCT apparatus in accordance with embodiments of the present invention.

FIG. 5 illustrates an exemplary Micro Electro-Mechanical Systems (MEMS) interferometer implemented within an OCT apparatus 100 in accordance with embodiments of the present invention. The MEMS interferometer can be fabricated, for example, in silicon, such that one arm of the interferometer is in silicon and the other arm is in air.

As shown in FIG. 5, the incident beam L1 produced by the light source 120 enters the MEMS interferometer through an input fiber groove in a MEMS silicon die 110. The incident beam L1 travels through the input fiber groove until it reaches a half plane beam splitter 130 formed at an interface between the silicon die 110 and air 115. The silicon/air interface beam splitter 30 is positioned at an angle (for example, 45 degrees) from the incident beam L1. The desired angle is produced by photolithographically defining a surface of the silicon medium 110 adjacent the input fiber groove.

Upon impinging the half plane beam splitter 130, the incident beam L1 is split into two interfering beams L2 and L4. L2 originates from the partial reflection of the incident beam L1 from the silicon/air half plane beam splitter 130, and thus has a reflection angle equal to the beam incidence angle. L4 originates from the partial transmission of the incident beam L1 through silicon/air half plane beam splitter 130 and propagates in silicon 110 at a refraction angle (determined by Snell's law). As a result, L2 propagates in air 115 towards reference mirror 150, while L4 propagates in silicon 110 towards sample 140.

The reference mirror 150 is moveable between a first position (Position 1) and a second position (Position 2) to effectuate a change in optical path length between the reference mirror 150 and the beam splitter 130. A further increase in the optical path length can be achieved by using fixed mirrors 158a and 158b and angling the reference mirror 150 to reflect beam L2 towards the mirrors 158a and 158b. Mirrors 158a and 158b are formed on a surface of the silicon medium 110 at positions designed to reflect beam L2 back towards reference mirror 150. For example, at Position 1, upon receiving beam L2, reference mirror 150 reflects beam L2 towards mirror 158a, which reflects the beam back towards reference mirror 150 to produce reflected beam L3 towards the beam splitter 130. Likewise, at Position 2, upon receiving beam L2, reference mirror 150 reflects beam L2 towards mirror 158b, which reflects the beam back towards reference mirror 150 to produce reflected beam L3 towards the beam splitter 130.

Reference mirror 150 is moveable using a MEMS actuator 195. The MEMS actuator 40 may be an electrostatic comb-drive actuator or other type of MEMS actuator. For example, by applying a voltage to the comb drive of the MEMS actuator 195, a potential difference can result across the actuator 195, which induces a capacitance therein, causing a driving force as well as a restoring force to be generated from the MEM actuator spring, thereby causing a displacement of reference mirror 150 to the desired position for reflection of the beam L2.

Figure 6:
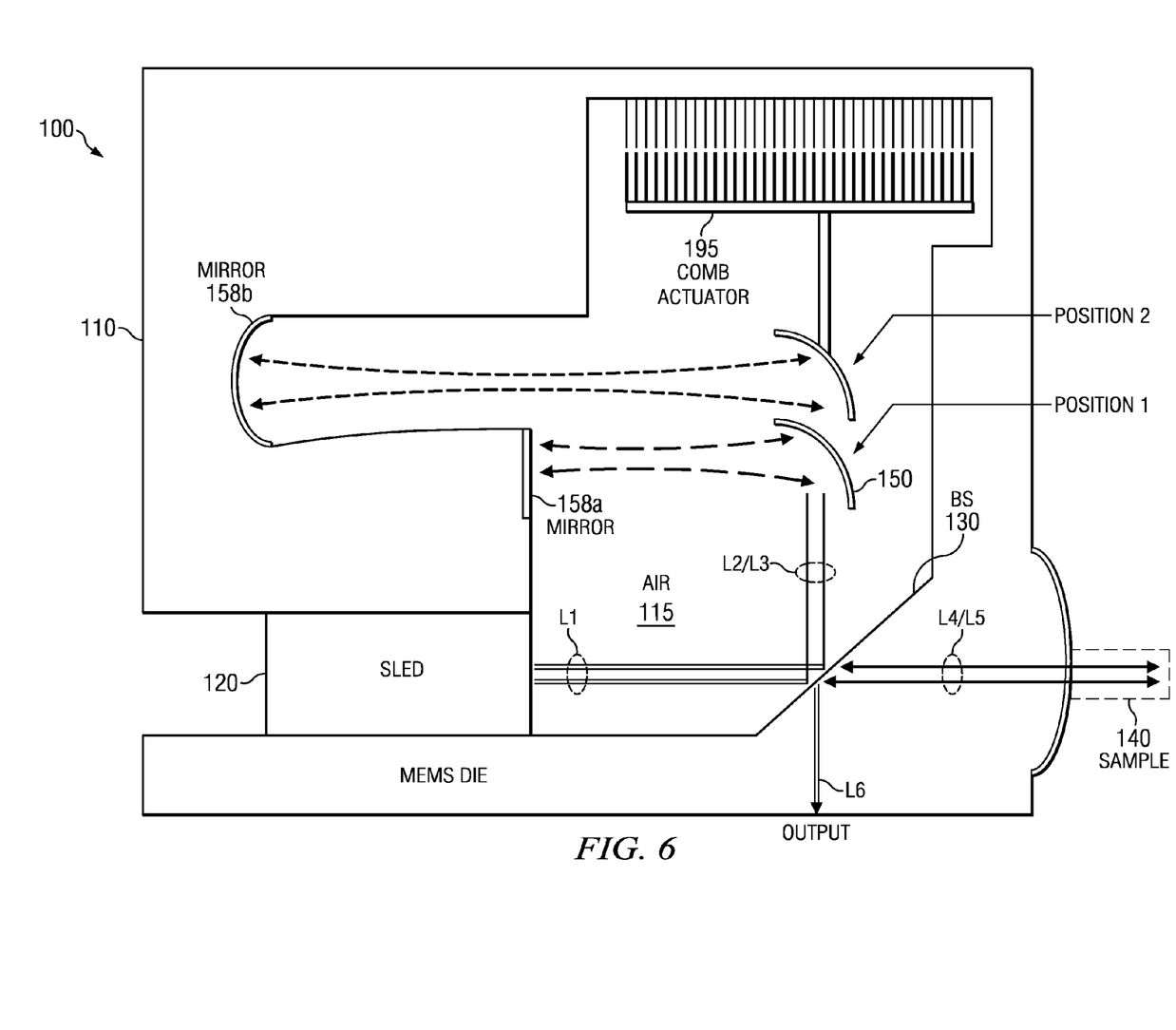
FIG. 6 illustrates another exemplary MEMS interferometer in accordance with embodiments of the present invention.

FIG. 6 illustrates another exemplary MEMS interferometer in accordance with embodiments of the present invention. In FIG. 6, the reference mirror 150 is a curved reflector. The curved reference mirror 150 is connected to the MEMS actuator 195, which could be, for example, a comb actuator. The curved reference mirror 150 is shown moveable between Position 1 and Position 2. At Position 1, the curved reference mirror 150 reflects the second beam towards a fixed flat reflector 158a, while in Position 2, the curved reference mirror reflects the second beam towards a fixed curved reflector 158b. By using a flat reflector 158a and a curved reflector 158b, the fixed reflectors 158a and 158b can be designed to be matched to the gaussian beam from the curved reference mirror 150 to increase the propagation distance and minimize the diffraction effect.

Figure 7:
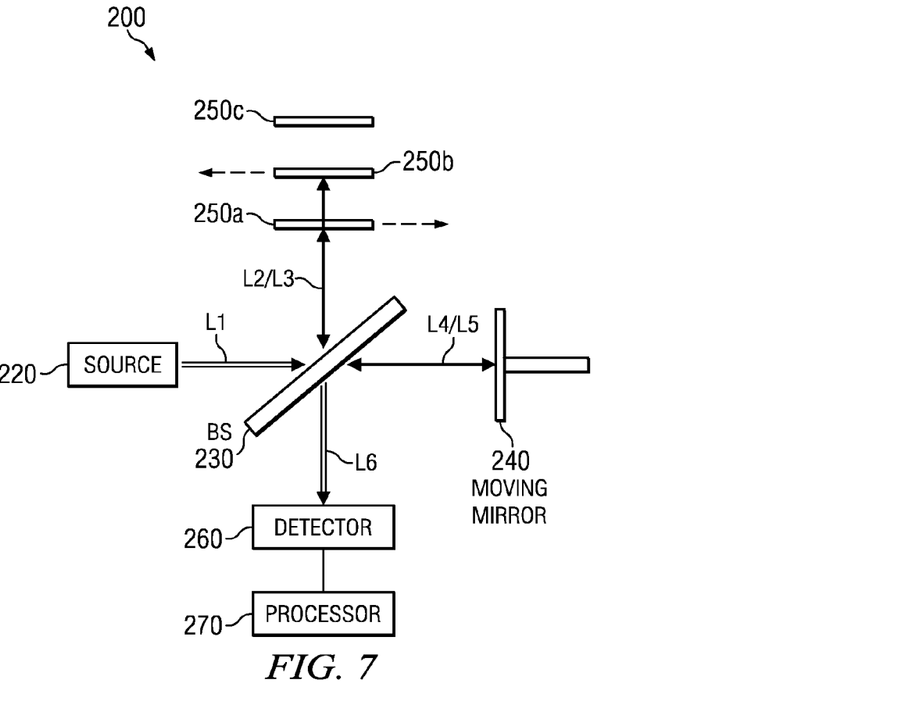
FIG. 7 illustrates an exemplary Fourier Transform spectrometer in accordance with embodiments of the present invention.

Turning now to FIG. 7, a variable optical path length reference mirror can also be used in Fourier Transform spectrometers 200 to increase the resolution without increasing the travel range of the moving mirror. The FT spectrometer 200 shown in FIG. 8 includes a light source 220, beam splitter 230, moving mirror 240, reference mirrors 250a-250c, detector 260 and processor 270. As in the interferometer shown in FIG. 1, light source 220 produces an incident beam L1 that impinges upon beam splitter 30, which is positioned at an angle (for example, 45 degrees) from the incident beam L1. The incident beam L1 is thus split in two beams L2 and L4, where L2 propagates towards the reference mirror 250 and L4 propagates towards the moving mirror 240.

L2 is reflected by reference mirror 250 to produce reflected beam L3, while L4 is reflected by moving mirror 240, thus producing reflected beam L5. As shown in FIG. 1, both beams L3 and L5 take the same optical path (in the opposite direction) after reflection from the reference mirror 250 and moving mirror 240, respectively, back towards beam splitter 30. Beam splitter 30 then partially transmits reflected beam L3 and partially reflects reflected beam L5 to produce a signal L6 that can be measured by detector 260.

In FT spectrometers, the resolution is mainly determined by the optical path difference between the two arms, which is typically controlled by the moving mirror 240 displacement. By enabling the reference mirror 150 position to also change, the resolution can be increased. For example, in an exemplary operation, reference mirror 250a is placed in the optical path of beam L2 and a measurement of the output intensity as a function of the moving mirror 240 position (or optical path difference) is taken at detector 260 to produce an interferogram. Thereafter, reference mirror 250a is moved out of the optical path of beam L2 to enable beam L2 to be reflected from reference mirror 250b and the measurement of the output intensity is repeated for the new optical path difference to produce another interferogram. This process can be repeated for reference mirror 250c and the measurements from each reference mirror 250a-c position can be combined at processor 270 to produce a final interferogram with increased resolution.

The processor 270 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processor 270 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

In all the above embodiments, the interferometer can be fabricated self-aligned in a single step of lithography-etching using the DRIE technology on SOI wafer, as shown in FIGS. 8A-8J. The integration of the different optical elements reduces the cost and time of alignment, and allows much more compact device to be produced, thus enhancing the portability and adaptation to biomedical applications.

Figure 8A:
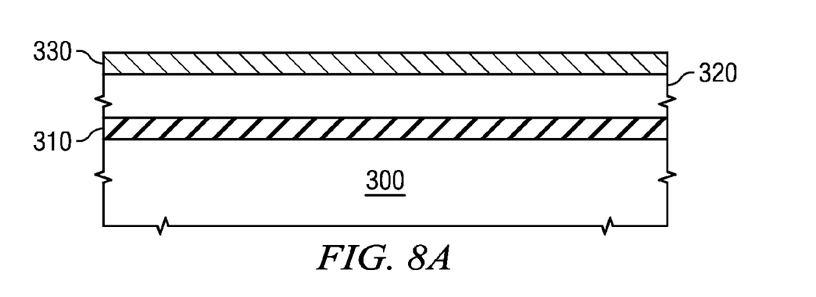
FIGS. 8A-8J illustrate exemplary fabrication process steps for fabricating an interferometer in accordance with embodiments of the present invention.
Figure 8B:
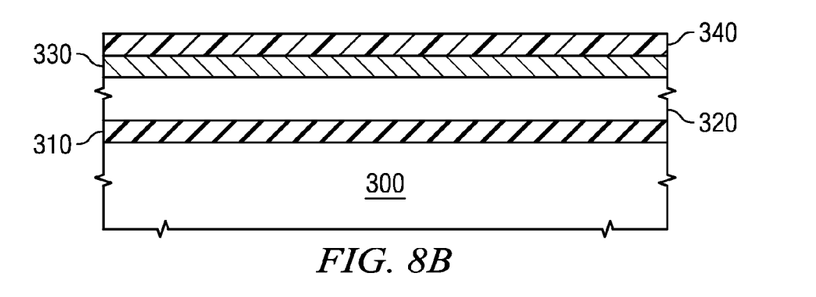
Figure 8C:
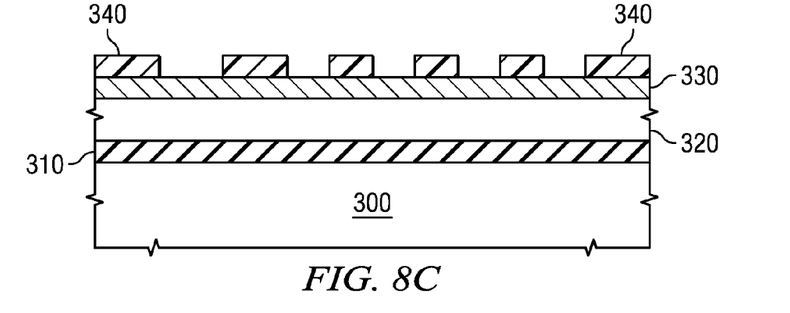
Figure 8D:
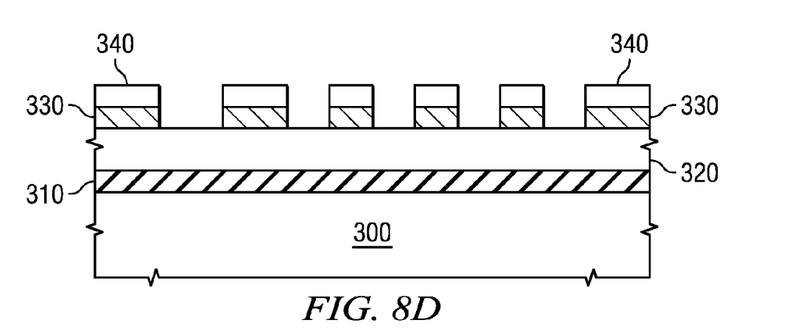
Figure 8E:
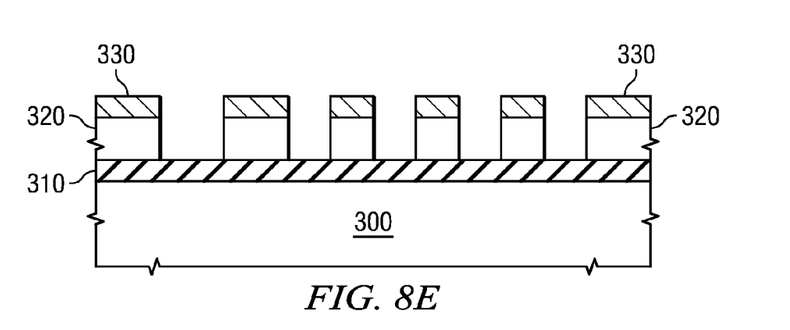
Figure 8F:
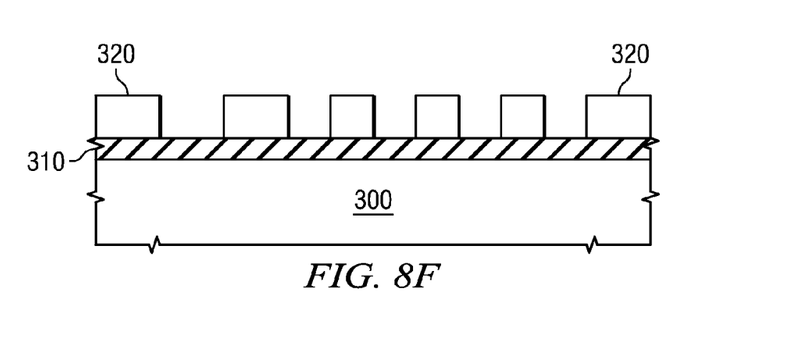

In FIG. 8A, an aluminum sputtering step is performed over an SOI wafer (layers 300-320) to form an aluminum layer 330, which functions as a mask for a subsequent etching of the top silicon layer 320 of the SOI wafer using DRIE, as shown in FIG. 8E. In FIG. 8B, a photo-resist material 340 is spun over the aluminum layer. In FIG. 8C, a lithography step is performed for realizing the microscanner. The lithography pattern in the photo-resist material 340 is transferred to the aluminum mask 330 by plasma chlorine etching of the aluminum layer, as shown in FIG. 8D. DRIE is then applied to the wafer until reaching the oxide etch stop layer 310 of the SOI, as shown in FIG. 8E. Then, as shown in FIG. 8F, the remaining aluminum mask 330 is removed using an Alu etch.

Figure 8G:
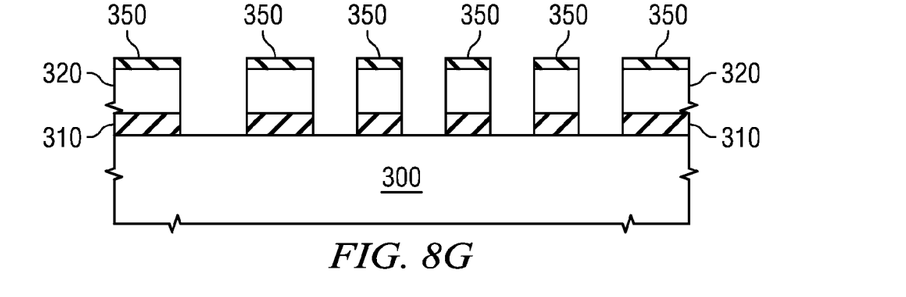
Figure 8H:
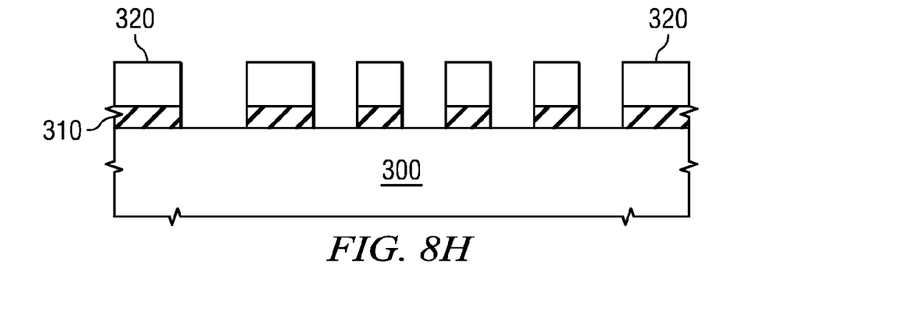
Figure 8I:
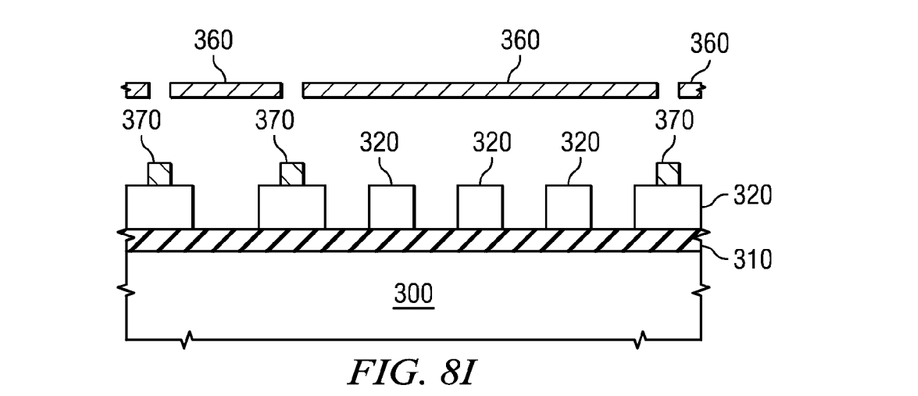
Figure 8J:
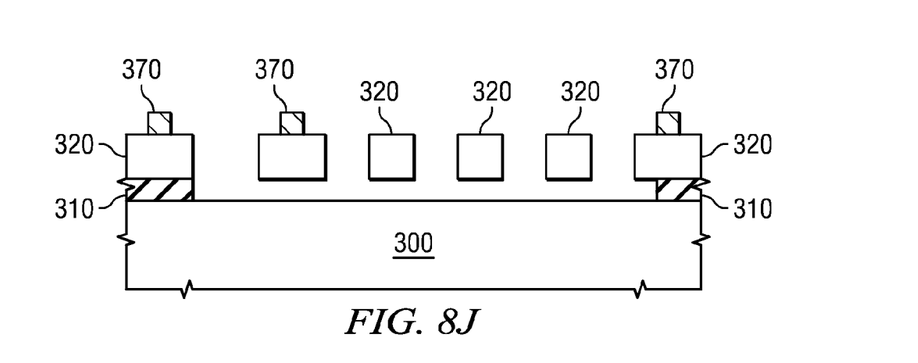

Turning now to FIG. 8I, a shadow mask 360 is used for the selective metallization 370 of the micromirrors and reflecting surfaces, as well as for creating connection pads. As shown in FIG. 8I, the shadow mask 360 is placed over the SOI substrate 300-320 to selectively sputter Cr/Au 370 onto desired portions of the top silicon layer 320. The projection lens required for the imaging applications could also be fabricated by the same technology if the imaging is in the IR range (in case of SOI technology as the Si is transparent in the IR). As shown in FIG. 8J, moving structures such as comb fingers, spring and moving mirror(s) are released by etching the buried $SiO_2$ layer 310 using HF, while fixed structures are not released due to the wider area of the $SiO_2$ beneath.

In embodiments in which the Bosch process is used for DRIE etching (shown in FIG. 8E), rough mirror surfaces may result due to the periodic nature of the process. Thus, as shown in FIG. 8G, growing a thin oxide layer 350 on the surfaces and then removing it by HF, as shown in FIG. 8H, can be useful before structure release to ensure a smoother mirror surface. However, if a cryogenic DRIE process is used in FIG. 8E, the process steps shown in FIGS. 8G and 8H would be unnecessary since a smoother surface is obtained directly after etching. In addition, the aluminum mask shown in FIG. 8A may not be necessary, as the process tends to have better selectivity between a photo-resist material and silicon at cryogenic temperatures.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:
1. An interferometer, comprising:
a beam splitter optically coupled to receive an incident beam and operable to split said incident beam into a first beam and a second beam;
a reflecting object on a first interferometer arm having a first optical path length and optically coupled to receive said first beam and operable to reflect said first beam to produce a first reflected beam directed towards said beam splitter;
a moveable reference mirror on a second interferometer arm optically coupled to:
receive, at an initial time, said second beam while said reference mirror is in an initial position having an initial optical path length, said reference mirror further operable to reflect said second beam to produce an initial second reflected beam directed towards said beam splitter to cause interference between said first reflected beam and said initial second reflected beam at said beam splitter and produce an initial interferogram therefrom; and
receive, at an additional time subsequent to said first time, said second beam while said reference mirror is in an additional position having an additional optical path length, said additional optical path length being different from said initial optical path length, said reference mirror further operable to reflect said second beam to produce an additional second reflected beam directed towards said beam splitter to cause interference between said first reflected beam and said additional second reflected beam at said beam splitter and produce an additional interferogram therefrom;
a detector including an optical spectrometer optically coupled to receive said initial interferogram and measure said initial interferogram to produce an initial measured interferogram, said optical spectrometer further optically coupled to receive said additional interferogram and measure said additional interferogram to produce an additional measured interferogram; and
a processor using a first inverse Fourier transform (IFFT) of said initial measured interferogram and an additional IFFT of said additional measured interferogram to produce a final interferogram from a combination thereof, said first IFFT representing a first depth scan of said reflecting object and said second IFFT representing a second depth scan of said reflecting object, said first depth scan overlapping said second depth scan, said final interferogram having an optical path length difference between said first interferometer arm and said second interferometer arm corresponding to a sum of a respective optical path difference of said initial interferogram and said additional interferogram.

2. The interferometer of claim 1, wherein said reference mirror includes a single moveable mirror moveable between at least said initial position and said additional position.

3. The interferometer of claim 1, wherein said reference mirror includes a first mirror at said initial position and a second mirror at additional position.

4. The interferometer of claim 3, wherein said first mirror and said second mirror are selected by physically removing one of said first mirror and said second mirror and physically inserting the other of said first mirror and said second mirror.

5. The interferometer of claim 1, wherein said interferometer is a Michelson interferometer for use within an Optical Coherence Tomography (OCT) apparatus.

6. The interferometer of claim 5, wherein the OCT apparatus applies a spectral domain OCT technique or a frequency domain technique for each position of said reference mirror to obtain a respective interferogram and combines each of said interferograms to obtain said final interferogram in a shifted spectral domain or a shifted frequency domain OCT technique.

7. The interferometer of claim 6, wherein:
said reflecting object is a sample under test;
said initial interferogram is used to produce a first depth scan signal;

said additional interferogram is used to produce a second depth scan signal; and a final reconstructed depth scan is produced from a combination of said first depth scan signal and said second depth scan signal.

8. The interferometer of claim 7, wherein said initial position and said additional position are separated by a maximum scanning depth of said OCT apparatus.

9. The interferometer of claim 7, wherein said initial position and said additional position are separated by less than a maximum scanning depth of said OCT apparatus to improve a signal-to-noise ratio in said final interferogram.

10. The interferometer of claim 1, wherein said reference mirror is optically coupled to receive, at a plurality of subsequent times, said second beam while said reference mirror is in different positions at different optical path lengths from said beam splitter to produce a plurality interferograms contributing to said final interferogram.

11. An Optical Coherence Tomography apparatus, comprising:
an interferometer including:
a beam splitter optically coupled to receive an incident beam and operable to split said incident beam into a first beam and a second beam;
a sample under test optically coupled to receive said first beam and operable to reflect said first beam to produce a first reflected beam directed towards said beam splitter;
a moveable reference mirror optically coupled to:
receive, at an initial time, said second beam while said reference mirror is in an initial position having an initial optical path length, said reference mirror further operable to reflect said second beam to produce an initial second reflected beam directed towards said beam splitter to cause interference between said first reflected beam and said initial second reflected beam at said beam splitter and produce an initial interferogram therefrom; and
receive, at an additional time subsequent to said first time, said second beam while said reference mirror is in an additional position having an additional optical path length, said additional optical path length being different from said initial optical path length, said reference mirror further operable to reflect said second beam to produce an additional second reflected beam directed towards said beam splitter to cause interference between said first reflected beam and said additional second reflected beam at said beam splitter and produce an additional interferogram therefrom; and a detector including an optical spectrometer optically coupled to receive said initial interferogram, measure said initial interferogram to produce an initial measured interferogram and inverse Fourier transform (IFFT) said initial measured interferogram to produce an initial IFFT interferogram, said optical spectrometer further optically coupled to receive said additional interferogram, measure said additional interferogram to produce an additional measured interferogram and inverse Fourier transform (IFFT) said additional measured interferogram to produce an additional IFFT interferogram; and a processor coupled to receive said initial IFFT interferogram and said additional IFFT interferogram, said processor producing a first depth scan signal of said reflecting object from said initial IFFT interferogram and a second depth scan signal of said reflecting object from said additional IFFT interferogram, said first depth scan signal overlapping said second depth scan signal, said processor further for combining said first depth scan signal and said second depth scan signal to produce a final depth scan signal.

* * * * *

UNITED STATES PATENT AND TRADEMARK OFFICE
CERTIFICATE OF CORRECTION

PATENT NO.         : 8,792,105 B2
APPLICATION NO.    : 13/009473
DATED              : July 29, 2014
INVENTOR(S)        : Diaa Khalil et al.

It is certified that error appears in the above-identified patent and that said Letters Patent is hereby corrected as shown below:

On the Title page and in the Specification, Column 1, Lines 1-4, Title should read:

INTERFEROMETER WITH VARIABLE OPTICAL PATH LENGTH REFERENCE MIRROR AND APPLICATIONS THEREOF

Signed and Sealed this
Fifth Day of July, 2016

Michelle K. Lee
*Director of the United States Patent and Trademark Office*